Aug. 14, 1934.  K. I. MARSHALL  1,970,048
APPARATUS FOR SEPARATION OF SUSPENDED MATERIAL FROM GASES
Filed Nov. 13, 1931
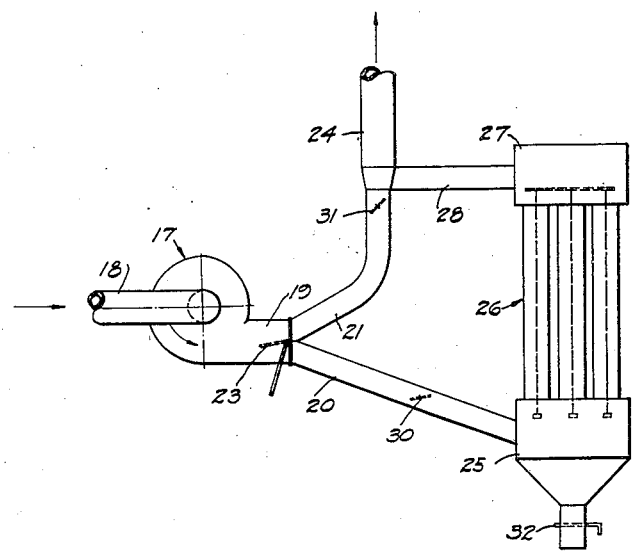
INVENTOR.
KENNETH I. MARSHALL
BY
ATTORNEYS.

Patented Aug. 14, 1934

1,970,048

UNITED STATES PATENT OFFICE 1,970,048

APPARATUS FOR SEPARATION OF SUSPENDED MATERIAL FROM GASES

Kenneth I. Marshall, Los Angeles, Calif., assignor to International Precipitation Company, Los Angeles, Calif., a corporation of California Application November 13, 1931, Serial No. 574,897

1 Claim. (Cl. 183—7)

This invention relates to means for separating suspended material, such as dust, fume, et cetera, from gases, and the main object of the invention is to provide means whereby an efficient separation of suspended material from gas may be obtained by the combined action of centrifugal and electrical separating means.

A further object of the invention is to so combine a centrifugal separating operation with an electrical separating operation that increased working capacity, together with high efficiency, is secured, due to the combined result of such operations.

This application is a continuation, in part, of my application for United States Letters Patent, filed July 27, 1927, Serial No. 208,826.

In the operation of centrifugal apparatus, such as cyclones, it has been found that there is a tendency for the dust or other suspended particles, which have been separated by centrifugal action, to be picked up again by the rapidly moving gas and carried forward out of the centrifugal collecting means. My invention provides for overcoming this defect by utilizing a portion of the gas stream to carry the separated material out of the centrifugal collecting chamber and then subjecting such portion of gas with the material carried thereby, to a more efficient collecting action, namely, an electrical precipitation operation, to effect the final collection of such material.

The accompanying drawing illustrates, in side elevation, a form of apparatus embodying my invention.

The centrifugal separating action may be carried out in any suitable centrifugal apparatus, for example, a centrifugal fan or blower 17 may be used, the inlet 18 for the gas to be operated upon being connected to the intake of said fan or blower, and the outlet 19 of said fan or blower being connected at a part which is relatively close to the periphery of the fan casing to an outlet pipe 20 and at a point which is less close to the periphery of the blower casing to a pipe 21, so that relatively clean gas will pass from the blower to the pipe 21 and gas containing suspended material in greater concentration will pass to pipe 20. A damper or deflector means 23 is shown as adjustably mounted within the outlet 19 of the blower to adjustably control the proportion of gas which passes to the respective pipes 20 and 21. Pipe 21 leads to an outlet flue 24 for clean gas and pipe 20 leads to the inlet header or means 25 of an electrical precipitator 26, the outlet header or means 27 of said precipitator being connected to an outlet flue 28 which may discharge into the outlet flue 24 aforesaid. Dampers 30 and 31 may be provided in the respective pipes 20 and 21 to further regulate the passage of gas in the respective flues, said dampers operating in conjunction with or alternatively to the damper means 23 aforesaid.

The electrical precipitator 26 may be of any usual or suitable construction adapted to subject the gas passing therethrough to the action of electrical fields in such manner as to cause electrical precipitation of suspended material carried thereby.

The operation of this form of the invention is as follows: By the operation of the centrifugal fan or blower 17, the gas passing thereto from the inlet 18 is subjected to centrifugal action tending to throw the heavier particles toward the periphery of the blower casing and at the same time propel the gas at high velocity through the outlet of the blower. By suitable adjustment of the damper means aforesaid any desired proportion, preferably a minor portion, of the gas is skimmed off from the gas stream adjacent the peripheral portion of the blower casing, such stream containing suspended material in relatively high concentration, and relatively clean gas is discharged through the pipe 21 to the outlet flue 24. The gas passing through the pipe 20 may comprise a minor portion of the gas but may be caused to carry with it substantially all of the suspended material originally contained in the gas, and by the operation of the electrical precipitator 26 such suspended material may be substantially completely separated from such minor portion of the gas and removed through material outlet means 32, the clean gas passing through outlet flue 28 to the main outlet flue 24 or being otherwise discharged.

By bleeding off a portion of the gas stream entering the centrifugal separating apparatus 17 and causing such portion of the gas to carry with it substantially all of the suspended material originally contained in the gas, while permitting the major portion of the gas substantially free from dust to pass off through the clean gas outlet pipe 21, it is possible to greatly increase the working capacity of such apparatus while preventing any considerable portion of the separated suspended material from being picked up and carried forward with the clean gas through said outlet pipe 21, and on account of the high separating efficiency of the electrical precipitator it is possible to cause the gas delivered from said precipitator through outlet flue 28 to be also substantially freed of suspended material. Furthermore, the fact that the major portion of the gas to be treated is delivered through outlet pipe 21 and only a minor portion of such gas passes through pipe 20 to the electrical precipitator enables an electrical precipitator of relatively small size to be used, it being understood that the dimensions of an electrical precipitator for treatment of a gas of given characteristics and for a given cleaning efficiency are determined by the volume of gas to be treated.

The electrical precipitating operation in connection with either of the above described embodiments of my invention is preferably affected by the use of unidirectional high voltage fields, produced for example by the application to the electrodes of the precipitation, of unidirectional current resulting from the rectification of high tension alternating current, in the usual manner of electrical precipitation operation.

I claim:

Apparatus for separating suspended material from gases, comprising a centrifugal separating means provided with an inlet for gas carrying suspended material and with two gas outlet connections, said centrifugal separating means being adapted to discharge gas substantially free from suspended material to one of said outlet connections and to concentrate substantially all of the dust in a portion of the gas and discharge said portion containing relatively high concentration of suspended material to the other of said outlet connections, electrical precipitating apparatus connected to the outlet connection for the gas with relatively high concentration of suspended material for electrical precipitation of such suspended material from the gas passing through the electrical precipitator, and damper means associated with said gas outlet connections for said centrifugal separating means and operable to vary the relative proportion of gas delivered through the respective outlet connections.

KENNETH I. MARSHALL.